United States Patent [19]
Nill

[11] 3,909,698
[45] Sept. 30, 1975

[54] REGULATED AC TO DC CONVERTER HAVING A CONTROLLABLE RECTIFIER ASSEMBLY

[75] Inventor: Reiner Nill, Mannheim-Wallstadt, Germany

[73] Assignee: Brown, Boveri & Cie Aktiengesellschaft, Manheim, Germany

[22] Filed: Mar. 25, 1974

[21] Appl. No.: 454,699

[52] U.S. Cl. .................... 321/10; 321/9 A; 321/19; 321/20; 321/47; 323/20; 323/24; 323/119
[51] Int. Cl.² ...................... H02M 7/17; G05F 1/68
[58] Field of Search .............. 321/8, 10, 18, 19, 46, 321/47, 20, 9 A; 323/119, 120, 121, 122, 127, 24

[56] References Cited
UNITED STATES PATENTS

| | | | |
|---|---|---|---|
| 3,453,526 | 7/1969 | Bowles | 321/19 |
| 3,535,611 | 10/1970 | Toulemonde | 321/18 X |
| 3,832,620 | 8/1974 | Pollard | 321/19 X |

*Primary Examiner*—Gerald Goldberg
*Attorney, Agent, or Firm*—Toren, McGeady and Stanger

[57] ABSTRACT

An output-regulated AC to DC converter has a rectifying stage including a plurality of thyristors each shunted by a diode of opposite polarity. The excitation of a coil disposed between an input transformer of the converter and the rectifying stage is controlled by selectively varying the thyristor conduction patterns so that the output DC voltage may be added to or subtracted from the transformer output voltage, depending on the sense of deviation of the actual coil current from a reference coil current. Such reference current, in turn, is derived as a sinusoidal quantity whose phase is coincident with that of the AC input voltage to the converter and whose amplitude is proportional to the difference between the DC output voltage of the converter and a desired value.

7 Claims, 5 Drawing Figures

REGULATED AC TO DC CONVERTER HAVING A CONTROLLABLE RECTIFIER ASSEMBLY

BACKGROUND OF THE INVENTION

When employing AC-to-DC converters between an ideally sinusoidal AC input voltage source and a filtered DC output, it is desirable to optimize the power factor of the AC source in order to keep spurious current components to a minimum. For this purpose, there presently exist converters of this type which are transformer-coupled to the AC input voltage and which employ, as a rectifier stage, a plurality of controllable thyristors operable by an ignition control circuit. Such type of converter is useful, e.g., as the input portion of an overall single phase to multi-phase convecter having an intermediate DC stage.

In a known AC-DC converter of this type the total conductive intervals of the thyristors (i.e., the intervals between the ignition and quenching pulses applied thereto) are controlled in accordance with changes in the DC output of the converter in such a manner as to keep the input power factor within a prescribed range. Unfortunately, such designs have been susceptible to losses resulting from undesired harmonic components of the AC input. Such harmonics do not contribute in any way to the useful power to the DC load, but must nevertheless be taken into account in selecting the size and capacity (and thereby the expense) of the converter components.

SUMMARY OF THE INVENTION

The invention provides an improved AC to DC converter of the thyristor-controlled type which both maintains an optimum power factor of the AC source and minimizes harmonic losses and distortions on the DC load. In an illustrative embodiment, a coil is disposed on the AC portion of the converter between the output of the coupling transformer and the input of the rectifier stage, and a plurality of diodes are individually connected across the thyristors with opposite polarity thereto. Additionally, means are provided for generating a sinusoidal reference current in phase with the AC input current through the coil, such reference current having an amplitude proportional to the difference between the actual DC load output voltage and a desired value.

The ignition control facilities for the thyristors are arranged to adjust their conduction intervals in such a manner that the amplitude of the deviation of the actual coil current from the above-mentioned reference current is maintained within predetermined limits. Such adjustment is accomplished by controlling the instantaneous driving voltage for the coil.

In particular, the ignition control facilities are suitably arranged to ignite selected thyristors in a first pattern to place the DC output voltage in adding relation to the transformer output voltage relative to the coil when such deviation is of one sense. Similarly, the facilities are arranged to ignite the selected thyristors in a second pattern to place such DC voltage in subtracting relation to the transformer output voltage relative to the coil when such deviation is of the opposite sense.

BRIEF DESCRIPTION OF THE DRAWINGS

The invention is further set forth in the following detailed description taken in conjunction with the appended drawings, in which.

DETAILED DESCRIPTION

Figure 1:
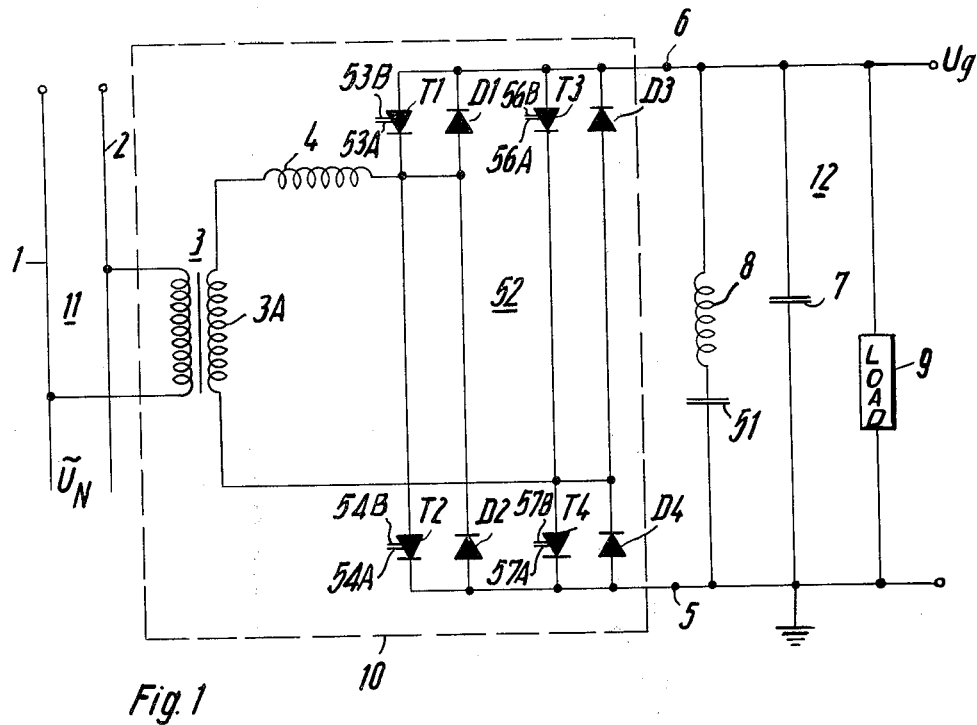
FIG. 1 is a schematic diagram of an AC to DC converter including a bridge-type thyristor rectifier stage suitable for use in the present invention.

Referring now to the drawings, FIG. 1 shows an AC to DC converter controlled by thyratron-like switching elements, illustratively thyristors. An ideally sinusoidal AC input voltage $\tilde{U}_N$ from a source 11 is coupled via a 1:1 transformer 3 to the converter 10, which produces an output DC voltage Ug across terminals 5 and 6 of a DC load 9. The load 9 forms part of a DC output stage 12 that has a filter network including two parallel branches. One of such branches includes a coil 8 and a capacitor 51, and the other branch includes a capacitor 7.

A secondary winding 3A of the transformer 3 is coupled to the input of a controllable full-wave bridge rectifier 52, whose output is applied to terminals 5 and 6. The bridge 52 includes a first serially aiding pair of thyristors $T_1$ and $T_2$ in parallel with a second serially aiding pair of thyristors $T_3$ and $T_4$. Input connections on the AC side of the bridge 52 are made between the junction of the thyristors $T_1$ and $T_2$ and the junction of the thyristors $T_3$ and $T_4$.

The thyristor $T_1$ has an ignition electrode 53A and a quenching electrode 53B. In like manner the thyristors $T_2$, $T_3$ and $T_4$ have ignition electrodes 54A, 56A and 57A, respectively, and quenching electrodes 54B, 56B and 57B respectively.

In known converter arrangements of this type, the conduction intervals of the several thyristors are made responsive to variations in the DC output voltage in such a manner that the power factor of the AC source remains essentially constant. In such known arrangements, however, harmonics present in the input AC voltage lead to losses and distortion in the DC load. In accordance with the invention, such disadvantages are avoided by the additional facilities shown in FIGS. 1 and 2.

Specifically, a coil 4 is disposed on the AC side of converter 10 between the secondary winding 3A and the input of the bridge 52. A pair of diodes $D_1$ and $D_2$ are individually connected across thyristors T1 and T2 with opposite polarity thereto. Similarly, diodes D3 and D4 are individually connected across thyristors T3 and T4 with opposite polarity thereto.

Suitable ignition facilities for the bridge 52 are provided so that the effective voltage excitation for the coil 4 can be discretely varied from a maximum value $\tilde{U}_N + Ug$ to a minimum value $\tilde{U}_N - Ug$. Such discrete switching of the coil excitation voltage is advantageously employed to correct power factor and harmonic aberrations in the converter 10 by maintaining, within prescribed limits, the deviation of the actual current through the coil 4 from an AC reference current. The AC reference current, in turn, is made responsive to variations in the DC load voltage as described below.

Figure 2:
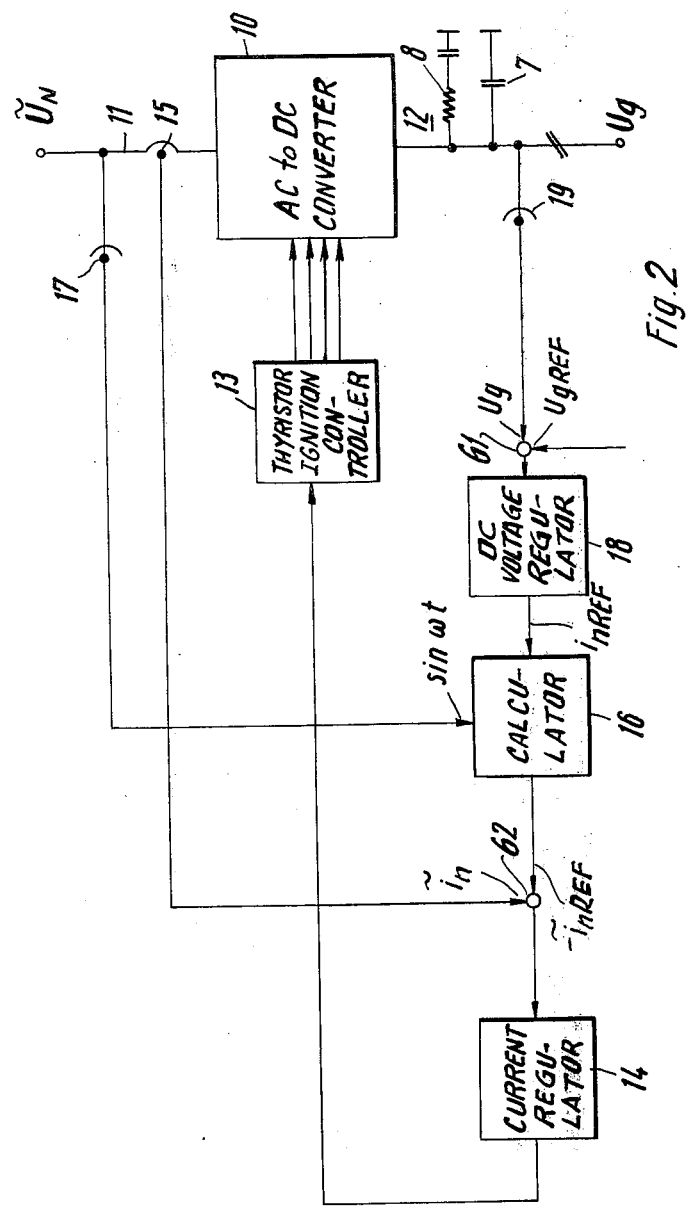
FIG. 2 is a combined block and schematic diagram of an arrangement in accordance with the invention for controlling the conduction intervals of the thyristors in the arrangement of FIG. 1.

The required thyristor conduction control facilities to accomplish this result are shown in FIG. 2. The instantaneous DC output voltage $Ug$ is sensed by a suitable detector 19 and applied to one input of a subtracting circuit 61. A reference quantity $Ug_{REF}$, representative of a desired value of the DC output voltage, is applied to a second input of the circuit 61. The difference between these applied voltages is converted by a DC voltage regulator 18 to a proportional DC quantity $i_{NREF}$ coupled to one input of a computer or calculator 16. The input sinusoidal AC voltage $\tilde{U}_N$ to the converter 10 is sensed by a suitable detector 17 and applied to a second (sync) input of the computer 16. The computer 16 is arranged to respond to such excitation of its first and second inputs to generate a sinusoidal AC reference current $\tilde{i}_{nREF}$ whose phase coincides with that of the AC voltage $\tilde{U}_N$ and whose amplitude is proportional to the quantity $i_{nREF}$ and thereby to the difference between $Ug$ and $Ug_{REF}$.

Figure 3:
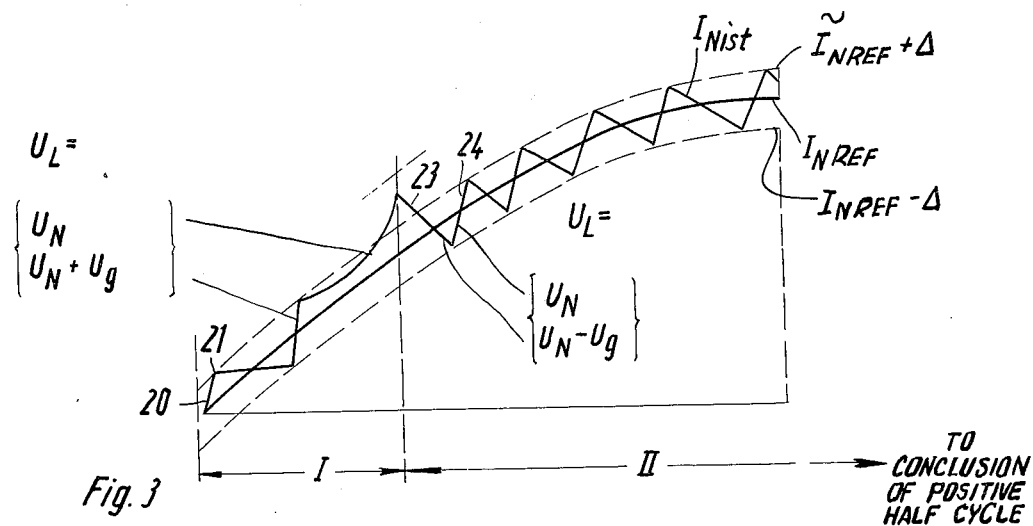
FIG. 3 is a diagram showing the regulated cause of current through a coil disposed in the AC branch of the convecter of FIG. 1 when controlled in accordance with the invention.

The AC reference quantity $\tilde{i}_{nREF}$ is applied to one input of a second subtracting circuit 62. A quantity $\tilde{i}_n$ representative of the instantaneous current value at the input of the converter 10 (and therefore of the instanteous current through the coil 4 of FIG. 1) is sensed by a suitable detector 15 and coupled to a second input of the circuit 62. A difference in quantity proportional to $\tilde{i}_n - \tilde{i}_{nREF}$ is coupled through a current regulator 14 to the input of a thyristor ignition controller 13. The latter determines the ignition and quenching instants for the thyristors T1, T2, T3, and T4 (FIG. 1) to maintain the quantity $\tilde{i}_n - \tilde{i}_{nREF}$ within prescribed limits, as follows:

The first positive quarter-cycle of a typical wave of the AC reference quantity $\tilde{i}_{nREF}$ is shown as curve $\tilde{I}n_{REF}$ IN FIG. 3. At the start of a first interval I of this quarter cycle, the controller ignites the thyristor T3 and maintains it conductive throughout the interval I; during this same interval, the controller alternately excites and extinguishes the thyristor T2. The effect of this is shown by the segmented curve $\tilde{I}_n$ of FIG. 3, representing the course of the current $\tilde{i}_N$.

In particular, at the start of interval I, both of thyristors T2 and T3 are made conductive by the controller, which causes the coil 4 (FIG. 1) to be excited by the sum of $\tilde{U}_n$ and $Ug$. Thus, the coil current starts to rise rapidly along segment 20 of curve $\tilde{I}_N$ until an upper limit $\tilde{I}_{NREF} + \Delta$ is reached. At this time, the controller quenches thyristor T2 so that only the voltage $\tilde{U}_N$ now excites the coil 4 via diode D1 and the still-conductive thyristor T3. Such smaller voltage excitation of the coil causes the next coil current segment 21 to have a shallow slope, such slope being maintained as the curve $I_{NREF}$ increases along its sinusoidal path until the actual coil current path $I_N$ has reached a lower limit $I_{NREF} - \Delta$. At this time, the controller re-ignites the thyristor T2 to restore the steep slope to the coil current. The number of times the above-described excitation switching is repeated in the interval I is dependent on the input frequency of the controller relative to the switching frequency of the controller 13.

If the current $I_N$ exceeds the upper limit $I_{NREF} + \Delta$, i.e., at the start of a second interval II (which is assumed to extend for the remainder of the positive half-cycle of the wave $I_{NREF}$), the controller responds by quenching the thyristor T3 while T2 is off. When this occurs, the voltage $U_N$ and $Ug$ are differentially connected to the coil 4 through the diodes D1 and D4, and the coil current drops sharply as shown by segment 23. When such coil current has dropped again to the lower limit $I_{NREF} - \Delta$, the controller reignites the thyristor T2, so that the voltage $U_N$ alone is coupled to the coil via diode D4 and the conductive thyristor T2, and the coil current rises again along segment 24. This repetitive behavior continues for the remainder of the positive half-cycle.

At the start of the negative half cycle of the wave $I_{NREF}$, an analogous behavior is repeated except that the thyristors T1 and T4 are now selectively excited by the controller instead of the thyristors T2 and T3, and the diodes D2 and D3 are selectively disposed in the voltage excitation path of the coil, rather than the diodes D1 and D4.

Figure 4:
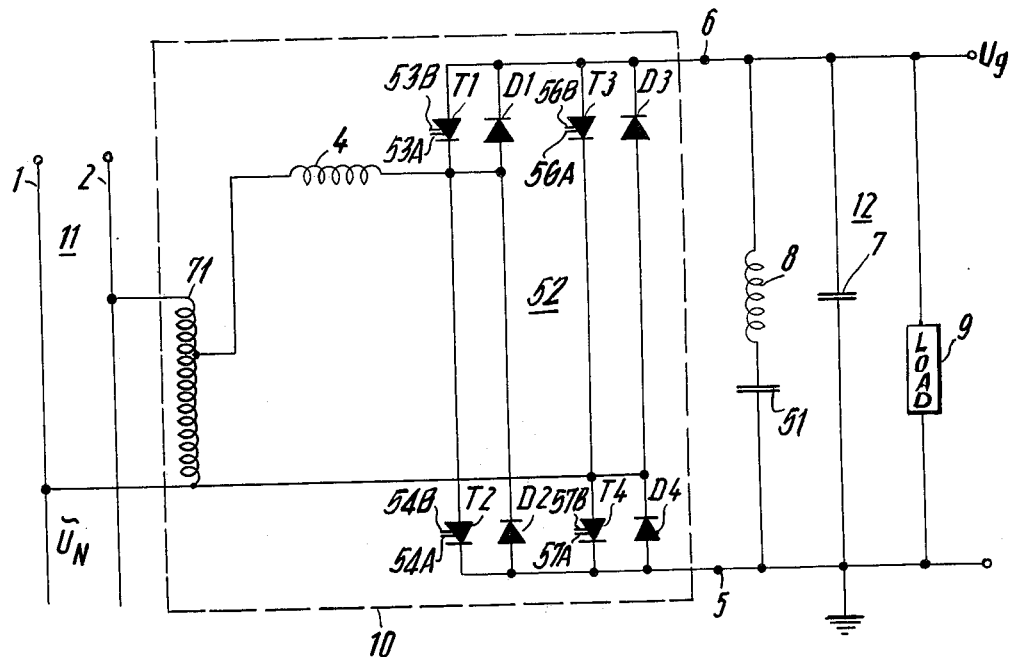
FIG. 4 is a schematic diagram of a convecter similar to FIG. 1 but employing an input autotransformer.

The arrangement shown in FIG. 4 is structurally and functionally analagous to that of FIG. 1, except that an autotransformer 71 is employed in FIG. 4 in place of the conventional transformer 3 of FIG. 1.

Figure 5:
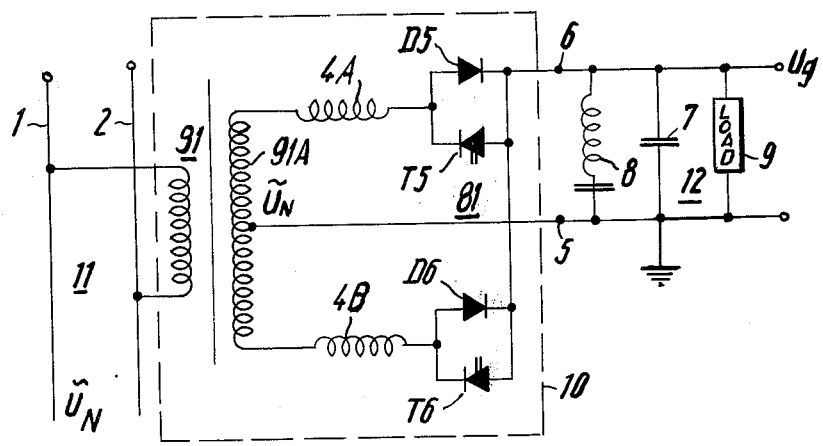
FIG. 5 is a schematic diagram of a convecter similar to FIG. 1 but employing a center-tapped input transformer.

An alternative embodiment of the converter 10 is shown in FIG. 5. In this case, a full-wave center-tapped rectifier assembly 81 including thyristors T5 and T6 couple to terminal 6 has been substituted for the bridge rectifier 52 of FIGS. 1 and 4. In FIG. 5, an upper terminal of a center-tapped secondary winding 91A of a transformer 91 is coupled to one input terminal of the rectifier 81 through a coil 4A. A lower terminal of the winding 91A is coupled to the other input terminal of the rectifier 81 through coil 4b. The thyristors T5 and T6 are individually shunted by diodes D5 and D6 of opposite polarity thereto. The terminal 5 is returned to the center tap of winding 91A.

By analogy to the technique described in connection with FIGS. 1–3 above, the controller selects the ignition patterns of the thyristors T5 and T6 (FIG. 5) to appropriately control the voltage excitation of a selected one of the coils 4a and 4b, i.e., to maintain the current $i_N$ through such selected coil to within a prescribed deviation from the derived AC reference current $i_{NREF}$. For example, during the interval I (FIG. 3) the thyristors T5 and T6 may be ignited and quenched in synchronism to produce the coil excitation necessary to generate the segments 20 and 21. At the start of interval II, thyristor T6 is ignited and maintained conductive throughout such interval, while the thyristor T5 is alternately ignited and quenched to yield the segments 23 and 24. In the negative half-cycle of the wave $I_{NREF}$, the thyristors T5 and T6 are again operated in synchronism in the interval corresponding to interval I, while in the interval corresponding to interval II the thyristor T5 remains conductive while the thyristor T6 is alternately ignited and quenched.

In the foregoing, the invention has been described in connection with preferred arrangements thereof. Many variations and modifications will now occur to those skilled in the art. For example, the converter 10 can be embodied with a plurality of AC inputs each connected in series and individually associated with a separate rectifier assembly, the DC outputs of the latter assemblies being connected in parallel. (In such a case, the excitation of corresponding thyristors in the successive rectifier assemblies can be staggered to further minimize distortion.) Alternatively, the converter can be adapted for operation with a multi-phase AC input by associating a separate rectifier stage with each phase and exciting each such stage from a common controller; again, the DC outputs of the several stages can be connected in parallel. It is accordingly desired that the scope of the appended claims not be limited to the specific disclosure herein contained.

What is claimed is:

1. In an AC to DC converter for transforming an ideally sinusoidal AC input voltage to a filtered DC output, the converter including a rectifying stage transformer-coupled to the AC input voltage and including a plurality of thyration-like switching elements, and ignition control means for regulating the conductive intervals of the switching elements to maintain the DC output within a predetermined range, the improvement wherein:

the converter further comprises, in combination, at least one coil disposed between the output of the coupling transformer and the input of the rectifying stage, and a plurality of diodes individually connected across the switching elements with opposite polarity thereto; and the ignition control means comprises, in combination, means synchronized with the AC input voltage for generating an AC reference current having a phase corresponding to the AC input voltage and an amplitude proportional to the difference between the DC output voltage of the converter and a desired value, and means for adjusting the conductive intervals of the switching elements in accordance with the instantaneous deviation of the actual AC current through the coil from the AC reference current.

2. The improvement as defined in claim 1, in which each switching element is a thyristor.

3. The improvement as defined in claim 1, in which the adjusting means comprises means for igniting selected ones of the switching elements in a first pattern to add the DC output voltage to the transformer output voltage when such instanteous deviation is of one sense and for igniting the selected switching elements in a second pattern to subtract the DC output voltage from the transformer output voltage when such instantaneous deviation is of the opposite sense.

4. The improvement as defined in claim 1, in which the rectifying stage is arranged as a full-wave bridge circuit.

5. The improvement as defined in claim 1, in which the transformer has a center-tapped secondary winding, and the converter has a pair of coils individually coupled between opposite terminals of the secondary winding and the respective input terminals of the rectifying stage.

6. The improvement as defined in claim 1, in which the transformer is an autotransformer.

7. A method of maintaining a desired DC output voltage value of an AC to DC converter including a rectifying stage transformer-coupled to a sinusoidal AC voltage and including a plurality of thyratron-like switching elements, a plurality of diodes individually connected across the thyristors with opposite polarity thereto, and a coil connected between the output of the transformer and the input of the rectifying stage, which comprises the steps of:

generating a first quantity proportional to the difference between the instantaneous DC output voltage and the desired value;

deriving, from the first quantity and the AC input voltage, a sinusoidal AC reference current having a phase synchronized with the AC input voltage and an amplitude proportional to the first quantity; and adjusting the conduction intervals of the switching elements in accordance with the instantaneous deviation of the AC current through the coil and the reference AC current to maintain the amplitude of such deviation within predetermined limits, the adjusting step comprising igniting selected ones of the switching elements in a first pattern to place the DC output voltage in adding relation to the transformer output voltage relative to the coil when such deviation is of one sense, and igniting the selected switching elements in a second pattern to place the DC output voltage in subtracting relation to the transformer output voltage relative to the coil when such deviation is of the opposite sense.

* * * * *